D. B. MORISON.
APPARATUS FOR HEATING AND EVAPORATING LIQUIDS BY MEANS OF STEAM.
APPLICATION FILED SEPT. 23, 1910.
1,000,285.
Patented Aug. 8, 1911.
3 SHEETS—SHEET 1.
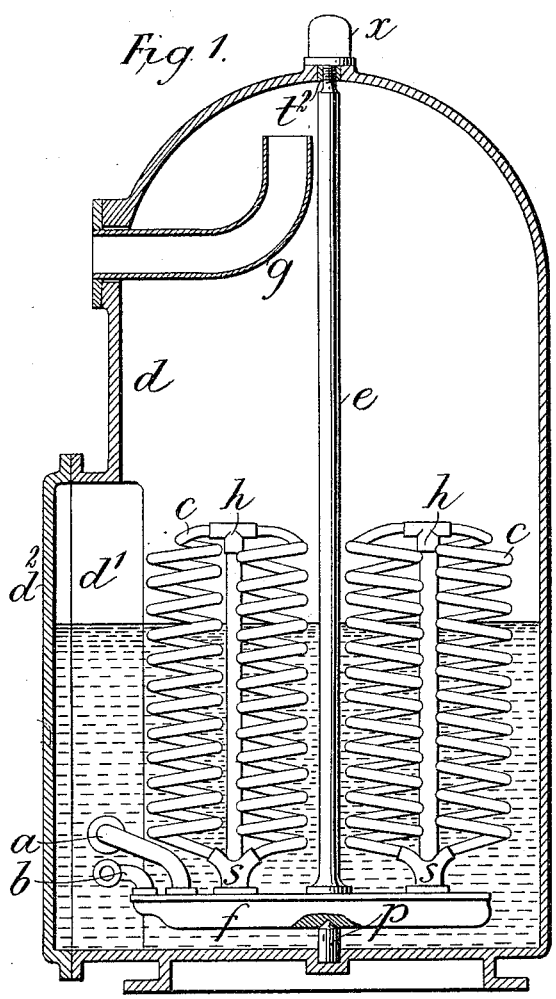
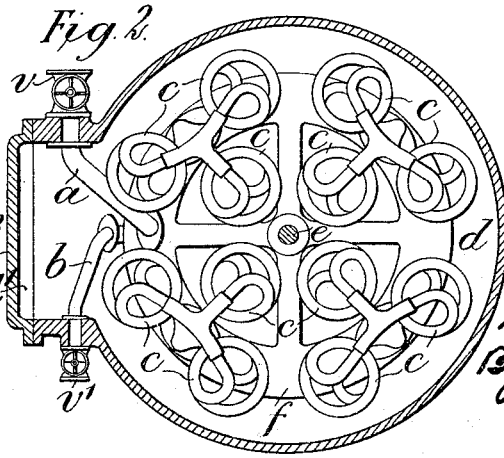

D. B. MORISON.
APPARATUS FOR HEATING AND EVAPORATING LIQUIDS BY MEANS OF STEAM.
APPLICATION FILED SEPT. 23, 1910.
1,000,285.
Patented Aug. 8, 1911.
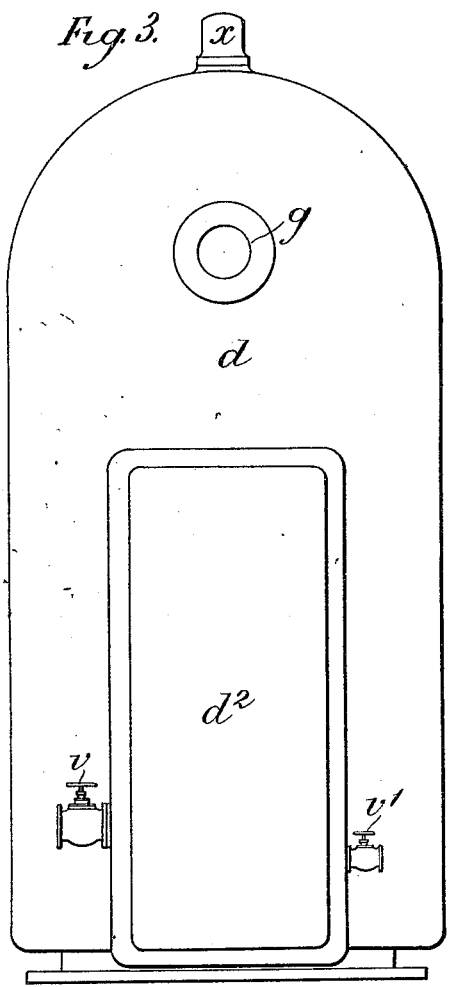
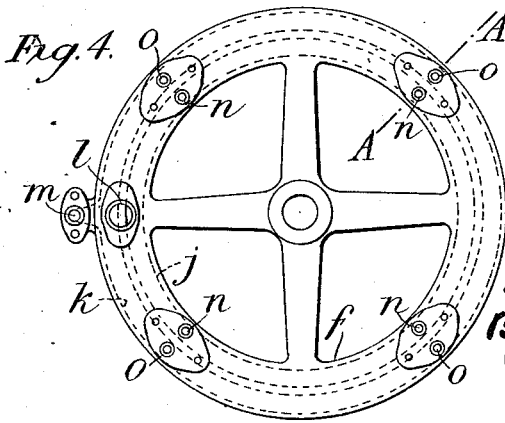

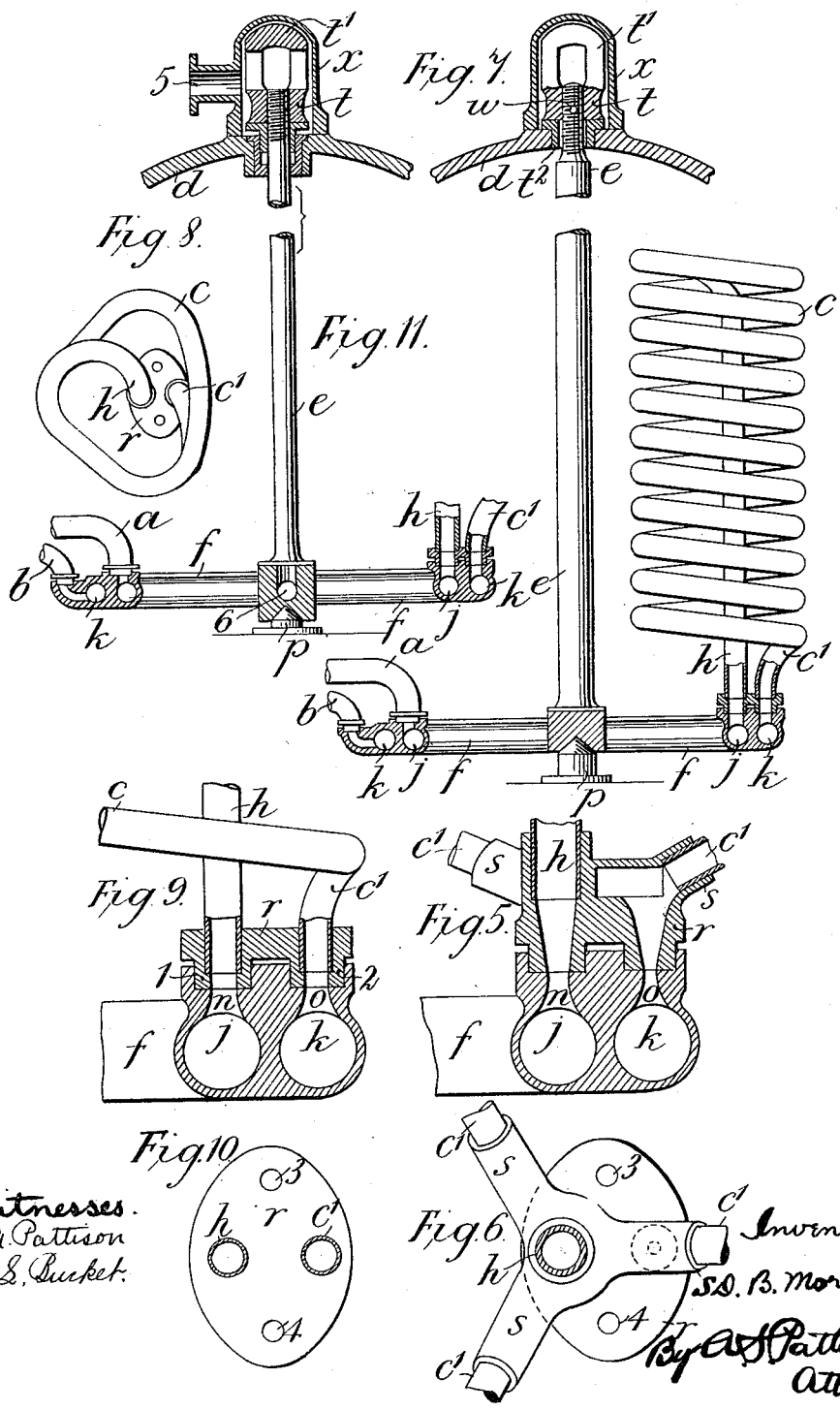

UNITED STATES PATENT OFFICE.

DONALD BARNS MORISON, OF HARTLEPOOL, ENGLAND.

APPARATUS FOR HEATING AND EVAPORATING LIQUIDS BY MEANS OF STEAM.

1,000,285.  Specification of Letters Patent.  Patented Aug. 8, 1911.

Application filed September 23, 1910. Serial No. 583,457.

*To all whom it may concern:*

Be it known that I, DONALD BARNS MORISON, a subject of the King of Great Britain and Ireland, residing at Hartlepool, in the county of Durham, England, have invented Improvements in and Relating to Apparatus for Heating and Evaporating Liquids by Means of Steam, of which the following is a specification.

This invention relates to improvements in that kind of apparatus suitable for heating or evaporating liquids by means of steam passing through coils, and specially suitable for evaporating sea water on shipboard to produce fresh water suitable for use as boiler feed water, or for other purposes, wherein the coils are carried by a frame or support mounted so as to be capable of being rotated about a vertical axis within a liquid containing vessel and formed with steam supply and water drainage passages in communication with the steam heating coils, the vessel being provided with a lateral opening, normally closed by a door, opposite which the coils can be successively brought.

The object of the present invention is to afford better facilities than heretofore for the easy examination, cleaning, jointing, withdrawal and replacement of the coils, to render the apparatus more durable, and to avoid troubles that have been experienced with the known constructions. For this purpose in apparatus of the kind referred to for heating or evaporating liquid by means of steam, the frame or support carrying the steam heating coils is mounted so as to be capable of being rotated within the liquid containing vessel upon a lower conical or like pivotal bearing and the steam supply and water drainage passages are arranged to extend around or partly around the peripheral portion of the frame and are connected either by pipes detachably secured to the peripheral portion of the frame to steam and water control valves on the liquid containing vessel, or the water drainage passage is connected to such a detachable pipe while the steam supply passage is connected through a central vertical steadying tube extending through the top of the vessel to an external steam supply pipe. The steam heating coils carried by the frame are arranged vertically, either singly, or in groups, and are connected at their upper ends to the steam supply passage and at their lower ends to the water drainage passage so that steam and resulting water of condensation flow in a downward direction only through each coil. Each coil or group of coils is connected to a single perforated plate or flange by which it is connected to the steam supply and water drainage passages in the frame, the said passages being common to all the coils or groups of coils. The inlet end or ends of the coil or group of coils may be connected to the top of a hollow standard fixed to the corresponding perforated plate or flange and the outlet end or ends of the coil or group of coils be fixed directly to the said plate or flange. With a view of reducing the size of the joint connections between the frame and the perforated plates or flanges to which the coils are connected, the cross sectional area of the steam inlet and water outlet passages through the plates or flanges and adjacent parts of the frame is made to gradually decrease and gradually increase in the direction of fluid flow, such passages being contracted to a minimum at the jointing faces of the parts mentioned. The frame with coils can be raised in the water containing vessel by means of its central steadying rod or tube which is adapted to be lifted from outside the vessel.

The accompanying illustrative drawings show different constructions of an evaporator according to the present invention.

Figure 1 is a sectional elevation, Fig. 2 a sectional plan and Fig. 3 a front elevation, showing one construction of evaporator embodying the invention. Figs. 4, 5 and 6 are detail views, Fig. 4 being a plan of a frame, Fig. 5 a vertical section of part thereof, to a larger scale, on the line A A of Fig. 4, showing the improved tubular connections, and Fig. 6 a plan of Fig. 5. Fig. 7 is a sectional elevation showing part of a modified construction of apparatus according to the invention; Fig. 8 shows, in plan, one of the coils with its junction flange; Fig. 9 shows in vertical section, to a larger scale than Figs. 7 and 8, the junction between the frame and hollow standard and coil, and Fig. 10 is a plan of the junction flange. Fig. 11 is a part sectional elevation showing a further modified construction.

In the evaporator shown in Figs. 1 to 6 inclusive, there are four groups of water heating coils each group comprising three coils *c* which are jointed to and supported by a wheel shaped frame $f$ in the rim of which are steam and water passages $j$ and $k$ respectively leading to and from the coils, such passages being connected by detachable pipes $a$ and $b$ to the steam supply and water drainage valves $v$ and $v^1$ respectively, on the exterior of the containing vessel $d$. The steam entering through pipe $a$ passes by way of the steam passage $j$ in the rim and the vertical pipes $h$ to the upper ends of the coils $c$, the drainage water therefrom flowing through the separate passage $k$ in the frame $f$ to the outlet pipe $b$. The frame $f$ is supported on a conical center $p$ and is also steadied by a central rod $e$ which is fixed to its upper side and held in position at the top of the containing vessel. The steam produced by the evaporation of water in the containing vessel $d$ passes away by a pipe $q$. The front of the evaporator is formed with an opening $d^1$ that is normally closed by a door $d^2$ and through which the coils can be examined and withdrawn when desired. The frame $f$ (see Fig. 4) is provided with an inlet $l$ through which steam enters the passage $j$ from the pipe $a$ and then passes through the outlets $n$ and hollow standards $h$ to the coils $c$ the drainage water from the coils flowing through inlets $o$ and passage $k$ in the frame to the water outlet $m$.

Fig. 5 illustrates the method of attaching the coils to the frame. The steam supply from the channel $j$ flows through each outlet $n$ and a passage in a junction flange $r$ up the vertical pipe or standard $h$ to the top of the heating coils $c$, the flange $r$, which is fixed to the pipe $h$, being provided with branches $s$ that are connected to the bottom ends of the coils through which and the inlet $o$ the condensed steam drains to the annular passage $k$. With the object of reducing the size of the joints 1 and 2 between the junction flange $r$ and frame $f$, the passages $n$ and $o$ in these parts are contracted at such joints, this arrangement being specially suitable for large constructions.

Fig. 6 shows the position of the three branches $s$ of the junction flange $r$ and also the central pipe $h$, the flange being attached to the frame by two studs fixed in the frame and passing through holes 3 and 4 in the flange.

Although the heating coils are shown in groups of three in Figs 1 and 2, any number of coils may be provided.

In the modified arrangement shown in Figs 7 to 10 inclusive, each hollow standard $h$ is connected to a single coil $c$. The frame $f$ is supported, as in Fig. 1, on a conical center $p$, and is also steadied by the rod $e$ which is held at the top of the containing vessel $d$ by a nut $t$ having a looplike upper extension $t^1$ which may be used for lifting the frame $f$, or relieving the weight on the center $p$, when it is required to bring any desired coil opposite the doorway in the vessel. The nut $t$, which is secured by a pin $w$, normally rests upon a bush $t^2$ and is covered by a dome $x$ which prevents leakage of steam from the containing vessel. Although only one coil is shown in Fig. 7 it will be understood that more are provided. Figs. 8 and 9 show how the steam supply pipe $h$ and outlet end $c^1$ of the coil $c$ are connected to the junction flange $r$, the flange $r$ (see Fig. 10) being secured to the frame $f$ by two studs which pass through the holes 3 and 4. The steam supply to the passage $j$ in the rim of the frame $f$, may, instead of passing through a detachable pipe, such as $a$, be supplied to the said passage by means of a hollow central pipe which extends through the top of the containing vessel $d$, this arrangement being advantageous when it is desired to use low pressure steam in the heating coils. Fig. 11 shows an arrangement of this kind where the central rod $e$ is made hollow and connected at the top to a steam supply pipe 5 and at the bottom, through a passage 6 in one of the arms of the frame $f$, with the passage $j$.

What I claim is:—

1. Apparatus for heating or evaporating liquid, comprising a liquid containing vessel having a lateral opening normally closed by a door and a water outlet passage through its wall, a horizontal coil carrier having steam supply and water drainage passages therein, a lower pivotal support for said carrier, steam heating coils supported solely by and above said carrier and having their respective ends in connection with the said steam supply and water drainage passages, a steam supply pipe in communication with the steam supply passage in the carrier and a detachable laterally arranged water drainage pipe secured to the peripheral portion of said carrier and connecting the water drainage passage therein to the water outlet passage from said vessel, the said coil carrier being normally stationary but capable, when freed, of being rotated within the said vessel about a vertical axis whereby said heating coils can be severally brought opposite said lateral opening for removal or inspection.

2. Apparatus for heating or evaporating liquid, comprising a liquid containing vessel having a lateral opening normally closed by a door, a steam inlet passage and a water outlet passage through its wall, a horizontal coil carrier having steam supply and water drainage passages therein, a lower pivotal support for said carrier, steam heating coils supported solely by and above said carrier and having their respective ends in connection with the said steam supply and water drainage passages, and detachable laterally arranged steam supply and water drainage pipes connected to the peripheral portion of said carrier and vessel and in communication respectively with the steam and water passages in said carrier and the inlet and outlet passages in said vessel, the said coil carrier being normally stationary but capable upon disconnecting the detachable pipes of being rotated within said vessel about a vertical axis whereby said heating coils may be severally brought opposite said lateral opening for removal or inspection.

3. Apparatus for heating or evaporating liquid, comprising a liquid containing vessel having a lateral opening normally closed by a door and a water outlet, a coil carrier having separate steam and water passages therein, a lower centrally arranged conical pivotal bearing for said coil carrier, a steadying rod fixed to the upper side of said carrier and guided by said vessel, steam heating coils supported by said carrier and each connected at its upper end to the steam passage in said carrier and at its lower end to the water passage in said carrier, means for supplying steam to the steam passage, and a detachable pipe extending from the water passage in said carrier to the water outlet in said vessel, said coil carrier being normally stationary but capable of being turned on said pivotal bearing, for the purpose set forth.

4. Apparatus for heating or evaporating liquid, comprising a liquid containing vessel, having a lateral opening normally closed by a door, a coil carrier having separate steam and water passages therein, a conical pivotal bearing upon which said coil carrier is mounted, a steadying rod fixed to the upper side of said carrier and guided by said vessel, steam heating coils supported by said coil carrier, each of said coils being connected at its upper end to the steam passage in said carrier and the lower end of each coil being connected to the water passage in said carrier, means for supplying steam to the steam passage in said carrier, and a laterally arranged detachable pipe connecting the water drainage passage in said carrier to a water outlet in the side wall of said vessel, the said coil carrier being normally stationary but by disconnecting the said detachable pipe is capable of being turned on said pivotal bearing whereby said heating coils may be severally brought opposite said lateral opening for removal or inspection.

5. Apparatus for heating or evaporating liquid, comprising a liquid containing vessel having a lateral opening normally closed by a door and steam inlet and water outlet passages through its wall, a coil carrier having separate steam and water passages therein, a conical pivotal bearing upon which said coil carrier is mounted, a steadying rod fixed to the upper side of said carrier and guided by said vessel, steam heating coils supported by said carrier, each of said coils being connected at its upper and lower ends to the steam and water passages respectively in said carrier and detachable pipes within said vessel connecting the separate steam and water passages in said carrier to the steam inlet and water outlet passages in the wall of said vessel, the said coil carrier being normally stationary but by disconnecting the said detachable pipes is capable of being turned on said pivotal bearing whereby said heating coils may be severally brought opposite said lateral opening for removal or inspection.

6. Apparatus for heating or evaporating liquid, comprising a liquid containing vessel having a lateral opening normally closed by a door, and a water outlet passage through its wall, a pivotal bearing at the bottom of said vessel, a frame mounted upon said pivotal bearing and having separate steam and water passages extending around and within its rim, a steadying rod fixed to the upper side of said frame and guided by said vessel, a series of vertically arranged steam heating coils carried by said frame and in communication with the steam and water passages therein, means for supplying steam to said steam passage and a detachable pipe connecting the said water passage to the water outlet in the wall of said vessel, the said frame being normally stationary but by disconnecting said detachable pipe is capable of being turned upon said pivotal bearing whereby said heating coils may be severally brought opposite said lateral opening for removal or inspection.

7. Apparatus for heating or evaporating liquid, comprising a liquid containing vessel having a lateral opening normally closed by a door, and a steam inlet passage and a water outlet passage through its wall, a pivotal bearing at the bottom of said vessel, a rotary frame mounted upon said pivotal bearing and having separate steam and water passages extending around and within its rim, a steadying rod fixed to the upper side of said frame and guided by said vessel, a series of vertically arranged steam heating coils fixed to the upper side of said frame and each having its lower end in communication with the water passage therein and its upper end in direct communication through a straight portion of pipe with the steam passage in said frame, and detachable pipes within said vessel connecting respectively the steam supply and water drainage passages in said frame to the steam inlet and water outlet passages in the wall of said vessel, the said frame being normally stationary but by disconnecting said detachable pipes is capable of being turned upon said pivotal bearing, whereby said heating coils may be severally brought opposite said lateral opening for removal or inspection.

8. In apparatus for heating or evaporating liquid, a normally stationary circular coil carrier having adjacent steam supply and water drainage passages in and around its circular rim, a fixed pivotal support upon which said carrier can be turned, vertical pipes fixed to said carrier and in communication with the water drainage passage therein, and a series of vertically arranged steam heating coils connected at their lower ends to the water passage in said carrier and at their upper end to said vertical pipes, means for supplying steam to the steam passage in said carrier and means for withdrawing water from the water drainage passage in said carrier.

9. In apparatus for heating or evaporating liquid, a circular coil carrier normally stationary but mounted so as to be capable of being rotated about a vertical axis and having steam supply and water drainage passages in the rim thereof, a plurality of vertical hollow standards extending from the upper side of said carrier and in communication with the steam supply passage therein and a series of vertical steam heating coils in communication at one end with the upper end of one of the said standards and at the lower end with the water drainage passage in said carrier, the coils being arranged independently of each other, and the steam and resulting water of condensation flowing in a downward direction only through said heating coils.

10. In apparatus for heating or evaporating liquid, a coil carrier normally stationary but mounted so as to be capable of being rotated about a vertical axis and having separate steam supply and water drainage passages therein and sets of steam outlet and water drainage passages extending from the steam and water passages in said carrier to the upper side thereof, flanges secured to the upper side of said carrier and each having therethrough steam outlet and water drainage passages registering with those in the top of said carrier, a hollow standard fixed to each flange and in communication with the steam outlet therein and vertical steam heating coils each having its upper end connected to the upper end of one of said standards and its lower end connected to the corresponding flange and in communication with the water drainage passage therein.

11. In apparatus for heating or evaporating liquid, a coil carrier normally stationary but mounted so as to be capable of being rotated about a vertical axis and having separate steam supply and water drainage passages therein and sets of steam outlet and water drainage passages extending from the steam and water passages in said carrier to the upper side thereof, flanges secured to the upper side of said carrier and each having therethrough steam outlet and water drainage passages registering with those in the top of said carrier and a plurality of tubular branches communicating with the drainage passages therein, a plurality of hollow standards each fixed to one of said flanges and in communication with the steam inlet passages therein and groups of vertical steam heating coils, the coils in each group having their upper ends connected to the upper end of one of said hollow standards and their lower ends to the tubular branches of the flange to which said standard is connected.

12. In apparatus for heating or evaporating liquid, a coil carrier normally stationary but mounted so as to be capable of being rotated about a vertical axis and having separate steam supply and water drainage passages therein and sets of steam outlet and water drainage passages extending from the steam and water passages in said carrier to the upper side thereof, flanges secured to the upper side of said carrier and each having therethrough steam outlet and water drainage passages registering with those in the top of said carrier, the cross sectional area of each of the registering steam and water passages in the flanges and carrier gradually decreasing and then gradually increasing in the direction of fluid flow, each passage having its minimum cross sectional area at the jointing face of the flange, and steam heating coils connected to said flanges with their ends in communication with the steam and water passages therein.

13. Apparatus for heating and evaporating liquid, comprising a water containing vessel having a lateral opening normally closed by a door and steam inlet and water outlet passages through its wall, a pivotal bearing at the bottom of said vessel, a circular frame mounted on said pivot and having separate steam supply and water discharge passages extending within and around its rim, flanges detachably secured to the upper side of said rim and having steam and water passages registering with steam and water passages extending through the top of the rim and also tubular branches, hollow standards carried by said flanges and in communication with the steam passages in the top and around and within the rim, groups of steam heating coils, the coils in each group being connected at their upper ends in the top of one of said standards and at their lower ends to the tubular branches of the corresponding flange, and pipes detachably secured to the rim of the frame and wall of the vessel and connecting the steam and water drainage passages in these parts, the said circular frame being normally stationary but by disconnecting the detachable pipes is capable of being rotated within the said vessel whereby the said steam heating coils may be severally brought opposite said lateral opening for removal or inspection.

14. Apparatus for heating or evaporating liquid, comprising a liquid containing vessel, a coil carrier with steam heating coils thereon, a lower fixed pivotal bearing on which said coil carrier is normally mounted, a steadying rod fixed to the upper side of said carrier and extending through the top of said vessel, means secured to the upper end of said rod outside said vessel whereby the rod, carrier and coils can be lifted off said bearing, means for supplying steam to said coils and means for withdrawing water therefrom.

Signed at Hartlepool, England this thirteenth day of September 1910.

DONALD BARNS MORISON.

Witnesses:
HARRY FOTHERGILL,
ARTHUR JENNER.

Copies of this patent may be obtained for five cents each, by addressing the "Commissioner of Patents, Washington, D. C."